US012763497B2

(12) United States Patent
Wang

(10) Patent No.: US 12,763,497 B2
(45) Date of Patent: Oct. 13, 2026

(54) ELECTRICALLY CONDUCTIVE DEVICE

(71) Applicant: FIVEGRAND INTERNATIONAL CO., LTD., New Taipei City (TW)

(72) Inventor: Ting-Jui Wang, New Taipei City (TW)

(73) Assignee: FIVEGRAND INTERNATIONAL CO., LTD., New Taipei City (TW)

( * ) Notice: Subject to any disclaimer, the term of this patent is extended or adjusted under 35 U.S.C. 154(b) by 320 days.

(21) Appl. No.: 18/399,712

(22) Filed: Dec. 29, 2023

(65) Prior Publication Data

US 2024/0222885 A1 Jul. 4, 2024

(30) Foreign Application Priority Data

Dec. 29, 2022 (TW) ................................ 111150540

(51) Int. Cl.

*H01R 4/48* (2006.01)
*H01R 11/12* (2006.01)
*H01R 101/00* (2006.01)

(52) U.S. Cl.

CPC ........... *H01R 4/4872* (2013.01); *H01R 11/12* (2013.01); *H01R 2101/00* (2013.01)

(58) Field of Classification Search

CPC ... H01R 4/4872; H01R 11/12; H01R 2101/00
USPC ......................................... 439/840, 816, 819
See application file for complete search history.

(56) References Cited

U.S. PATENT DOCUMENTS 3,209,308 A * 9/1965 Aquillon .............. H01R 12/714 439/372
4,643,513 A * 2/1987 Martin ..................... H01R 4/34 439/788
4,907,989 A * 3/1990 Huska ...................... H01R 4/38 439/817
5,030,139 A * 7/1991 Huska ...................... H01R 4/38 439/817
2013/0005184 A1* 1/2013 Drehmann ........... H01R 4/4872 439/607.01
2013/0005198 A1* 1/2013 Furholzer ............ H01R 9/2608 439/819
2017/0276165 A1 9/2017 Matsunami et al.

FOREIGN PATENT DOCUMENTS

CN 205876905 U 1/2017

* cited by examiner

*Primary Examiner* — Gary F Paumen

(57) ABSTRACT

An electrically conductive device includes a body portion, a motion portion and a resilient component. The motion portion is movably fitted to the body portion. The resilient component is disposed at the body portion. The body portion, motion portion or resilient component is an electrical conduction component for conducting an electric current. Therefore, the electrically conductive device can be mounted on a first object and conduct an electric current between the first object and a second object to couple together or separate at least two objects and conduct an electric current between the two objects.

12 Claims, 14 Drawing Sheets

ELECTRICALLY CONDUCTIVE DEVICE

CROSS-REFERENCE TO RELATED APPLICATION

This non-provisional application claims priority under 35 U.S.C. § 119(a) on Patent Application No(s). 111150540 filed in Taiwan, R.O.C. on Dec. 29, 2022, the entire contents of which are hereby incorporated by reference.

BACKGROUND OF THE INVENTION

1. Field of the Invention

The present disclosure relates to an electrically conductive device, and in particular to an electrically conductive device adapted to couple together or separate at least two objects and enable electrical conduction therebetween.

2. Description of the Related Art

Conventionally, at least two objects are coupled together with a screw in order to be fastened together.

Although the aforesaid conventional fixing technique is able to fixedly couple at least two objects together in an inseparable way, it does not enable electrical conduction therebetween.

BRIEF SUMMARY OF THE INVENTION

In view of the aforesaid drawback of the prior art, it is an objective of the disclosure to provide an electrically conductive device adapted to couple together or separate at least two objects and enable electrical conduction therebetween.

To achieve the above and other objectives, the disclosure provides an electrically conductive device comprising a body portion, a motion portion and a resilient component. The motion portion is movably fitted to the body portion. The resilient component is disposed at the body portion. The body portion, the motion portion or the resilient component is an electrical conduction component for conducting an electric current.

The electrically conductive device is mounted on a first object to conduct an electric current between the first object and a second object and thereby effectuate electrical conduction therebetween.

The two ends of the resilient component abut against the body portion and the motion portion respectively to not only allow one side of the motion portion to press against the body portion but also allow electrical conduction to occur between the other side of the motion portion and an object so as to effectuate the electrical conduction as well.

The electrical conduction is further effectuated when the resilient component is in a compressed state.

Regarding the electrically conductive device, the body portion is mounted on a first object to conduct an electric current to a second object.

Regarding the electrically conductive device, the body portion is mounted on a first object, and the motion portion has a head portion, with a second object disposed between the head portion and the body portion, two ends of the resilient component abut against the body portion and the motion portion respectively such that the body portion and the motion portion resiliently clamp the second object through the resilient component, allowing an electric current to be conducted between the first object and the second object.

Regarding the electrically conductive device, the body portion is mounted on a first object, an end of the motion portion is movably provided with a head portion, another end of the motion portion is movably provided with a contact portion adapted to be in contact with a second object to allow an electric current to be conducted between the first object and the second object.

Regarding the electrically conductive device, the head portion is not in contact with the second object.

The electrically conductive device is mounted on a first object to conduct an electric current to a second object, the first object has a first electrically conductive element for conducting an electric current, and the second object has a second electrically conductive element for conducting an electric current.

Regarding the electrically conductive device, the body portion, the motion portion, the resilient component, the first electrically conductive element or the second electrically conductive element is a circuit, circuit board, copper-made item, gold-made item, silver-made item, solder, pad or electrical conduction engaging element.

Regarding the electrically conductive device, the body portion, the motion portion and the resilient component are copper-made items, gold-made items, silver-made items or electrical conduction components with electroplated layers.

Regarding the electrically conductive device, the body portion is soldered to, riveted to, expandedly connected to, fastened to or engaged with a first object.

Regarding the electrically conductive device, the motion portion is an engaging element, helical engaging element, convex engaging element, concave engaging element, clamp-engaging element, spherical element, convex element, concave element, wheel element, cylindrical element or resilient engaging element.

Regarding the electrically conductive device, the motion portion has an insulating portion, and the insulating portion is for use in operating or manipulating the motion portion.

Regarding the electrically conductive device, the motion portion and the resilient component are compressed, allowing a resilient intervening space to be formed between the motion portion and the body portion.

Regarding the electrically conductive device, the body portion is mounted on a first object, and the motion portion resiliently presses against, engages with, grips, pushes or abuts against a second object through compression of the resilient component, allowing an electric current from the first object to be conducted to the second object.

The electrically conductive device is mounted on a first object to conduct an electric current to a second object, wherein the first object or the second object is a circuit board, metallic element, heat-dissipating element, chip, IC, wire, cable, coil, slot, connector, motherboard, circuit, rail or casing.

The electrically conductive device is mounted on a first object to conduct an electric current between the first object and a second object, or the motion portion separates from the second object while conducting an electric current, so as to start or stop conduction of an electric current.

The electrically conductive device is mounted on a first object so as to be hot-plugged to or hot-unplugged from a second object, or the motion portion starts or stops the conduction of an electric current upon the hot-plugging or hot-unplugging, or the motion portion starts or stops the conduction of an electric current while there is electrical conduction between a first object and a second object.

Regarding the electrically conductive device, the motion portion enables an electric current to be passed to a second object, position-limits the second object or comes into contact with the second object.

Regarding the electrically conductive device, the motion portion has a pressing portion for pressing against the second object or a second electrically conductive element of the second object when the motion portion position-limits or comes into contact with a second object.

Regarding the electrically conductive device, the motion portion has a control portion.

Regarding the electrically conductive device, the motion portion has a control portion with a first height and a second height, the first height being greater than, less than or equal to the second height.

Regarding the electrically conductive device, the control portion is rotated to move the motion portion so as for the motion portion to come into contact with, be hot-plugged to or hot-unplugged from, or snap-stop a second object.

Regarding the electrically conductive device, the motion portion has a pressing portion or a clasping portion required for pressing-enabled electrical conduction, clasping-enabled electrical conduction or position-limitation-enabled electrical conduction.

Regarding the electrically conductive device, the motion portion conducts an electric current between a first object and a second object.

The electrically conductive device conducts an electric current between a first object and a second object.

Regarding the electrically conductive device, a position-limiting portion is disposed between the body portion and the motion portion and adapted to effectuate position limitation.

Regarding the electrically conductive device, the motion portion has a restraining portion, with the resilient component penetratingly disposed at the restraining portion to enhance the stability of the motion portion.

The electrically conductive device further comprises another motion portion corresponding in position to the motion portion, with the resilient component disposed between the motion portion and the other motion portion.

Regarding the electrically conductive device, the motion portion is fitted to a control portion such that the control portion and the motion portion move or undergo motion to start and stop an electric current or signal.

Regarding the electrically conductive device, the resilient component abuts against a conductor portion such that the conductor portion comes into contact with, interferes with, abuts against, resiliently comes into contact with, resiliently interferes with or resiliently abuts against the body portion and the motion portion to effectuate electrical conduction.

Regarding the electrically conductive device, the conductor portion is a leaf spring, copper sheet, copper-beryllium alloy element, object electroplated with an electrically conductive layer, resilient element or metallic element.

Regarding the electrically conductive device, the body portion, the motion portion and the resilient component are electrically conductive elements, or the body portion is an electrically conductive element, but the motion portion and the resilient component are not electrically conductive elements, or the body portion and the resilient component are electrically conductive elements, but the motion portion is not an electrically conductive element, or the body portion and the motion portion are electrically conductive elements, but the resilient component is not an electrically conductive element.

Regarding the electrically conductive device, the motion portion has a head portion and a neck portion, the neck portion passing through an admission portion of a second object, or the head portion and the neck portion engage with a movement portion of the second object to effectuate electrical conduction between a first object and the second object.

Regarding the electrically conductive device, the motion portion has a head portion, a fixed connection portion and a neck portion, the neck portion passing through an admission portion of a second object, or the head portion is lifted to allow the fixed connection portion to engage with a fixation portion of the second object, effectuating electrical conduction between a first object and the second object.

Regarding the electrically conductive device, the admission portion is larger than the head portion, or the movement portion is larger than the neck portion but smaller than the admission portion.

Regarding the electrically conductive device, the admission portion is larger than the head portion, or the movement portion is larger than the neck portion but smaller than the admission portion, or the movement portion is smaller than the fixed connection portion, or the fixation portion is larger than the fixed connection portion.

Regarding the electrically conductive device, the admission portion is a through-hole, slot portion, opening portion, slotted portion, closed opening or open opening.

Regarding the electrically conductive device, the motion portion or two ends of the motion portion are pull-operable or press-operable, or the motion portion is an electrically conductive element, or the motion portion is not an electrically conductive element, or the resilient component is an electrically conductive element, or the resilient component is not an electrically conductive element.

Therefore, an electrically conductive device of the disclosure can be mounted on a first object and conduct an electric current between the first object and a second object to couple together or separate at least two objects and conduct an electric current between the two objects.

DETAILED DESCRIPTION OF THE INVENTION

To facilitate understanding of the object, characteristics and effects of this present disclosure, embodiments together with the attached drawings for the detailed description of the present disclosure are provided.

Figure 1:
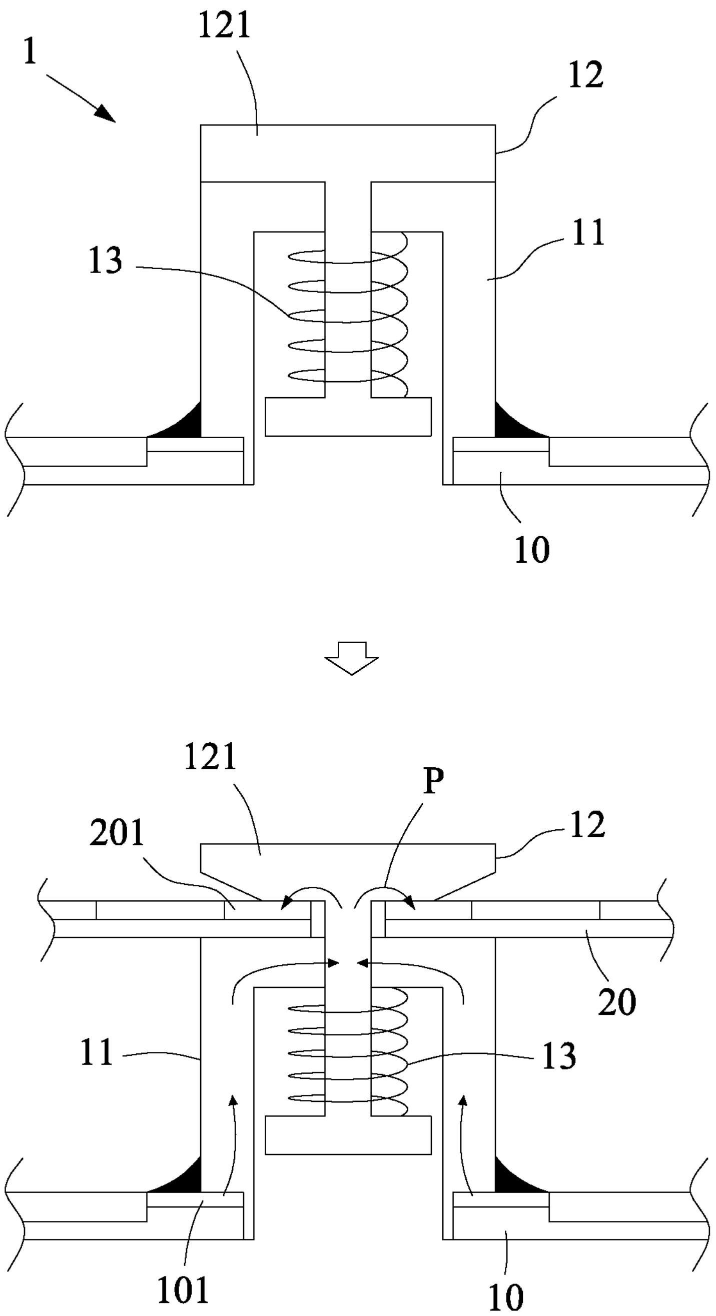
FIG. 1 is a schematic view of the operation of an electrically conductive device according to the first embodiment of the disclosure.
Figure 2:
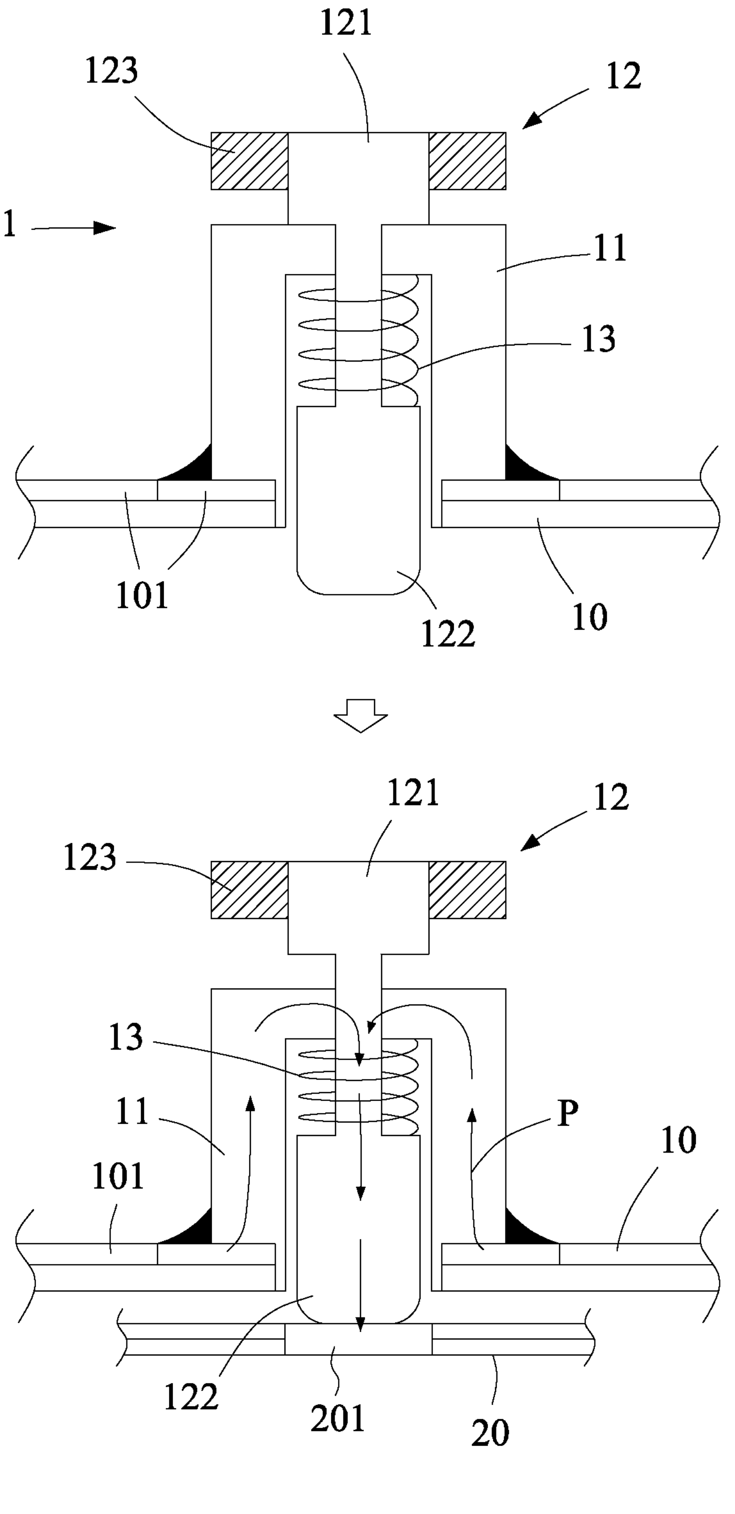
FIG. 2 is a schematic view of the operation of the electrically conductive device according to the second embodiment of the disclosure.
Figure 3:
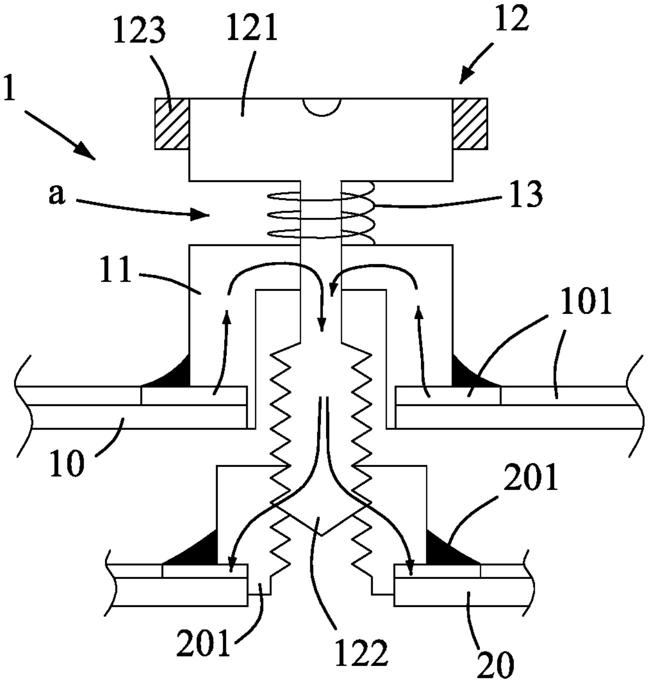
FIG. 3 is a schematic view of the operation of the electrically conductive device according to the third embodiment of the disclosure.
Figure 4:
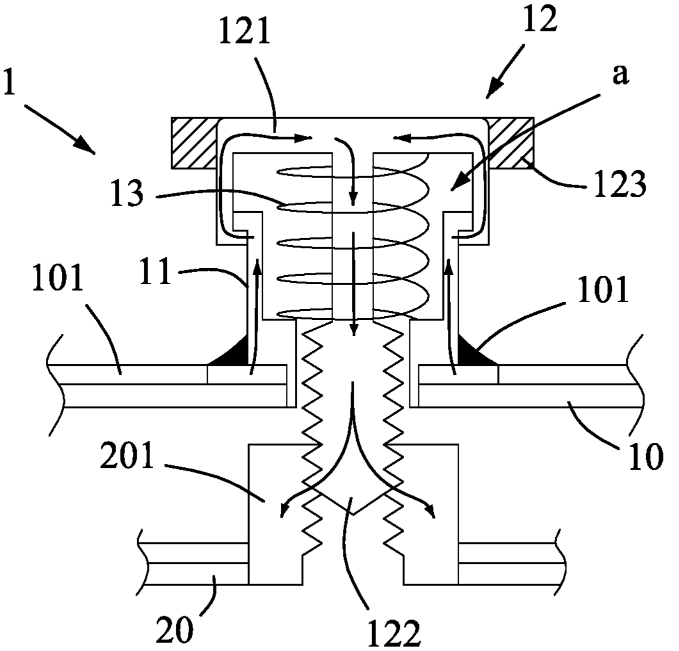
FIG. 4 is a schematic view of the operation of the electrically conductive device according to the fourth embodiment of the disclosure.
Figure 5:
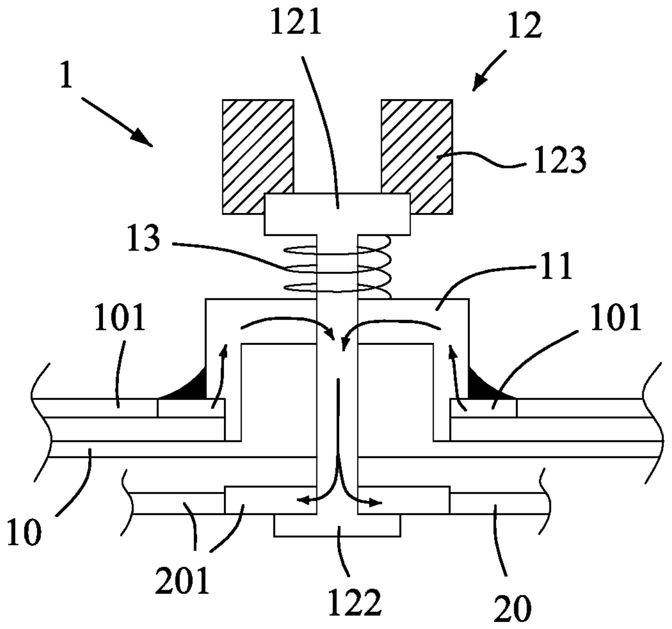
FIG. 5 is a schematic view of the operation of the electrically conductive device according to the fifth embodiment of the disclosure.
Figure 6:
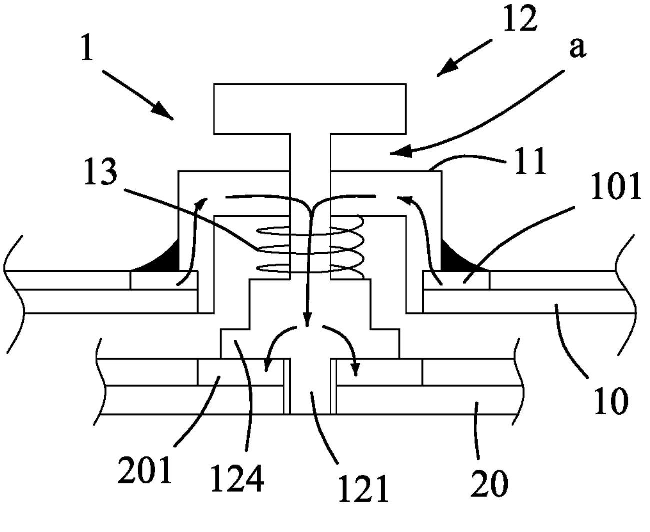
FIG. 6 is a schematic view of the operation of the electrically conductive device according to the sixth embodiment of the disclosure.

Referring to FIG. 1, the disclosure provides an electrically conductive device. The electrically conductive device 1 comprises a body portion 11, a motion portion 12 and a resilient component 13.

The motion portion 12 is disposed within and movably fitted to the body portion 11, wherein the motion portion 12 comprises a head portion 121 disposed outside the body portion 11.

The resilient component 13 is disposed at the body portion 11.

In an embodiment of the disclosure, the body portion 11, the motion portion 12 and the resilient component 13 are electrical conduction components for conducting an electric current.

In an embodiment of the disclosure, to enable electrical conduction, the electrically conductive device 1 is mounted on a first object 10 such that the two ends of the resilient component 13 abut against the body portion 11 and the motion portion 12 respectively to not only allow one side of the motion portion 12 to press against the body portion 11 but also allow electrical conduction to occur between the other side of the motion portion 12 and the first object 10. The motion portion 12 is conducive to the transmission of an electric current between the first object 10 and a second object 20, and thus the electrically conductive device 1 is capable passing an electric current to the first object 10 and the second object 20 (for example, conducting an electric current to the second object 20 from the first object 10, or conducting an electric current to the first object 10 from the second object 20).

To start using the electrically conductive device 1, the body portion 11 is mounted on a first object 10, whereas the motion portion 12 effectuates position limitation through the resilient component 13 and comes into contact with the second object 20 to effectuate electrical conduction through the resilient component 13 in a compressed state, or the motion portion 12 separates from the second object 20, whereas the electrically conductive device 1 couples together or separates the first object 10 and the second object 20, allowing an electric current to be passed to the second object 20 from the first object 10 when the first object 10 and the second object 20 are coupled together. Thus, the electrically conductive device 1 is mounted on the first object 10, and an electric current is conducted between the first object 10 and the second object 20. Therefore, the electrically conductive device 1 is able to couple together or separate at least two objects and enable the transmission of an electric current therebetween.

In addition to the aforesaid embodiments, in an embodiment of the disclosure, the body portion 11 is mounted on the first object 10, and the motion portion 12 has a head portion 121, with the second object 20 disposed between the head portion 121 and the body portion 11. The two ends of the resilient component 13 abut against the body portion 11 and the motion portion 12 respectively such that the body portion 11 and the motion portion 12 resiliently clamp the second object through the resilient component 13, allowing an electric current to be conducted between the first object and the second object via the conducting path P.

In addition to the aforesaid embodiments, in an embodiment of the disclosure, the body portion 11, the motion portion 12 and the resilient component 13 are copper-made items, gold-made items, silver-made items or electrical conduction components with electroplated layers. Thus, the electrically conductive device 1 is mounted on the first object 10 to conduct an electric current between the first object 10 and the second object 20.

In addition to the aforesaid embodiments, in an embodiment of the disclosure, the body portion 11 is mounted on the first object 10 by soldering, riveting, expanded connection, fastening or engagement. Thus, the body portion 11 of the electrically conductive device 1 is firmly mounted on the first object 10 to allow the first object 10 and the second object 20 to be coupled together firmly or separated, allowing an electric current to be steadily conducted between the first object 10 and the second object 20.

In addition to the aforesaid embodiments, in an embodiment of the disclosure, the first object 10 or the second object 20 is a circuit board, metallic element, heat-dissipating element, chip, IC, wire, cable, coil, slot, connector, motherboard, circuit, rail or casing. Thus, the disclosure meets actual application needs.

In addition to the aforesaid embodiments, in an embodiment of the disclosure, the body portion 11 is mounted on the first object 10, and the motion portion 12 resiliently presses against, engages with, grips, pushes or abuts against the second object 20 through compression of the resilient component 13, allowing an electric current from the first object 10 to be conducted to the second object 20.

In addition to the aforesaid embodiments, in an embodiment of the disclosure, the motion portion 12 not only conducts an electric current to the second object but also position-limits or comes into contact with the second object 20. Thus, the body portion 11 of the electrically conductive device 1 is firmly mounted on the first object 10 to couple together or separate the first object 10 and the second object 20 and steadily conduct an electric current between the first object 10 and the second object 20.

In addition to the aforesaid embodiments, in an embodiment of the disclosure, the electrically conductive device 1 is mounted on the first object 10 and adapted to conduct an electric current to the second object 20, the first object 10 has a first electrically conductive element 101 for conducting an electric current, and the second object 20 has a second electrically conductive element 201 for conducting an electric current.

In addition to the aforesaid embodiments, in an embodiment of the disclosure, the body portion 11, the motion portion 12 and the resilient component 13 are electrically conductive elements. Alternatively, the body portion 11 is an electrically conductive element, but the motion portion 12 and the resilient component 13 are not electrically conductive elements. Alternatively, the body portion 11 and the resilient component 13 are electrically conductive elements, but the motion portion 12 is not an electrically conductive element. Alternatively, the body portion 11 and the motion portion 12 are electrically conductive elements, but the resilient component 13 is not an electrically conductive element. Therefore, the disclosure meets actual application needs.

Referring to FIG. 2 through FIG. 6, in addition to the aforesaid embodiments, in an embodiment of the disclosure, the body portion 11 is mounted on the first object 10, whereas the motion portion 12 has one end movably provided with a head portion 121 and the other end movably provided with a contact portion 122, and the contact portion 122 comes into contact with the second object 20 so as for the motion portion 12 to undergo hot-plugging to start or stop the conduction of an electric current, allowing an electric current to be conducted between the first object 10 and the second object 20.

In addition to the aforesaid embodiments, in an embodiment of the disclosure, the motion portion 12 is an engaging element, helical engaging element, convex engaging element, concave engaging element, clamp-engaging element, convex element, concave element, cylindrical element or resilient engaging element. Thus, the motion portion 12 position-limits, separates from or comes into contact with the second object 20 to couple together or separate the first object 10 and the second object 20 and steadily conduct an electric current between the first object 10 and the second object 20.

In addition to the aforesaid embodiments, in an embodiment of the disclosure, the head portion 121 is not in contact with the second object 20, but the contact portion 122 is in contact with the second object 20, allowing an electric current to be conducted between the first object 10 and the second object 20.

In addition to the aforesaid embodiments, in an embodiment of the disclosure, the motion portion 12 has an insulating portion 123, and the insulating portion 123 is for use in operating or manipulating the motion portion 12. In this embodiment, the insulating portion 123 is disposed at the head portion 121, whereas an applied force is exerted on the insulating portion 123 to drive the movement of the head portion 121 and the contact portion 122 and thereby allow the contact portion 122 to come into contact with the second object 20, allowing an electric current to be conducted between the first object 10 and the second object 20.

In addition to the aforesaid embodiments, in an embodiment of the disclosure, the motion portion 12 and the resilient component 13 are compressed such that a resilient intervening space a is formed between the motion portion 12 and the body portion 11 to allow room for the displacement of the motion portion 12.

In addition to the aforesaid embodiments, in an embodiment of the disclosure, the body portion 11, the motion portion 12, the resilient component 13, the first electrically conductive element 101 or the second electrically conductive element 201 is a circuit, circuit board, copper-made item, gold-made item, silver-made item, solder, pad or electrical conduction engaging element. Therefore, the disclosure meets actual application needs.

In addition to the aforesaid embodiments, in an embodiment of the disclosure, the motion portion 12 has a pressing portion 124. The pressing portion 124 presses against the second object 20 or the second electrically conductive element 201 of the second object 20 when the contact portion 122 of the motion portion 12 position-limits or comes into contact with the second object 20.

Figure 7:
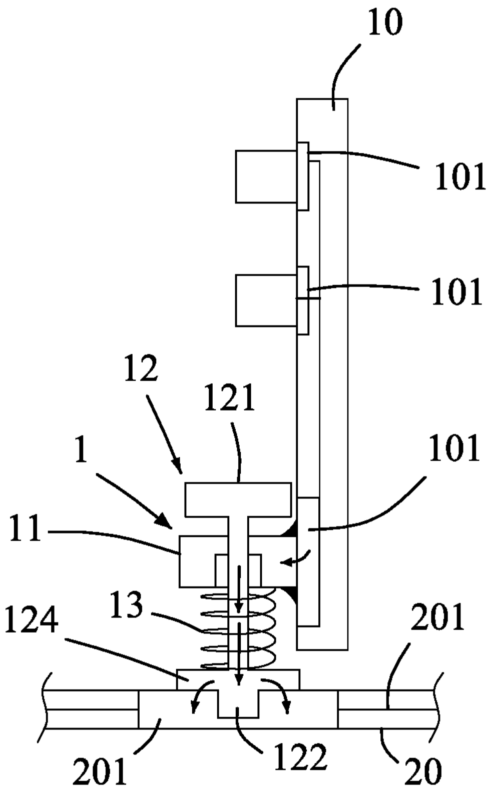
FIG. 7 is a schematic view of the operation of the electrically conductive device according to the seventh embodiment of the disclosure.

Referring to FIG. 7, in addition to the aforesaid embodiments, in an embodiment of the disclosure, the electrically conductive device 1 is mounted on the first object 10 and conducts an electric current to the second object 20, whereas the motion portion 12 separates from the second object 20 after conducting an electric current, so as to start or stop the conduction of an electric current. Therefore, the disclosure meets actual application needs.

In addition to the aforesaid embodiments, in an embodiment of the disclosure, the electrically conductive device 1 is mounted on the first object 10 so as to be hot-plugged to or hot-unplugged from the second object 20 such that the motion portion 12 starts or stops the conduction of an electric current (or the motion portion 12 starts or stops the conduction of an electric current while there is electrical conduction between the first object 10 and the second object 20), and the pressing portion 124 presses against the second object 20 or the second electrically conductive element 201 of the second object 20 when the contact portion 122 of the motion portion 12 position-limits or comes into contact with the second object 20. Therefore, the disclosure meets actual application needs.

Referring to FIG. 8 through FIG. 11, in addition to the aforesaid embodiments, in an embodiment of the disclosure, the electrically conductive device 1 is mounted on the first object 10 to conduct an electric current to the second object 20, the first object 10 has a first electrically conductive element 101 for conducting an electric current, and the second object 20 has the second electrically conductive element 201 for conducting an electric current, allowing the pressing portion 124 to press against the second object 20 when the motion portion 12 position-limits or comes into contact with the second object 20. Alternatively, the pressing portion 124 presses against the second electrically conductive element 201 of the second object 20 to allow the motion portion 12 to position-limit, separate from or come into contact with the second object 20 to couple together or separate the first object 10 and the second object 20 and steadily conduct an electric current between the first object 10 and the second object 20.

Figure 8:
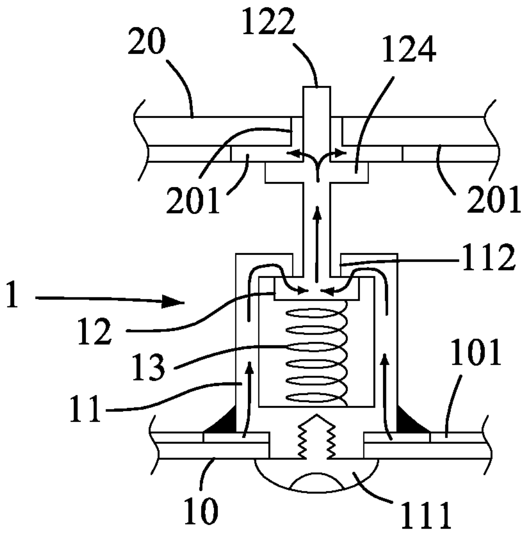
FIG. 8 is a schematic view of the operation of the electrically conductive device according to the eighth embodiment of the disclosure.
Figure 9:
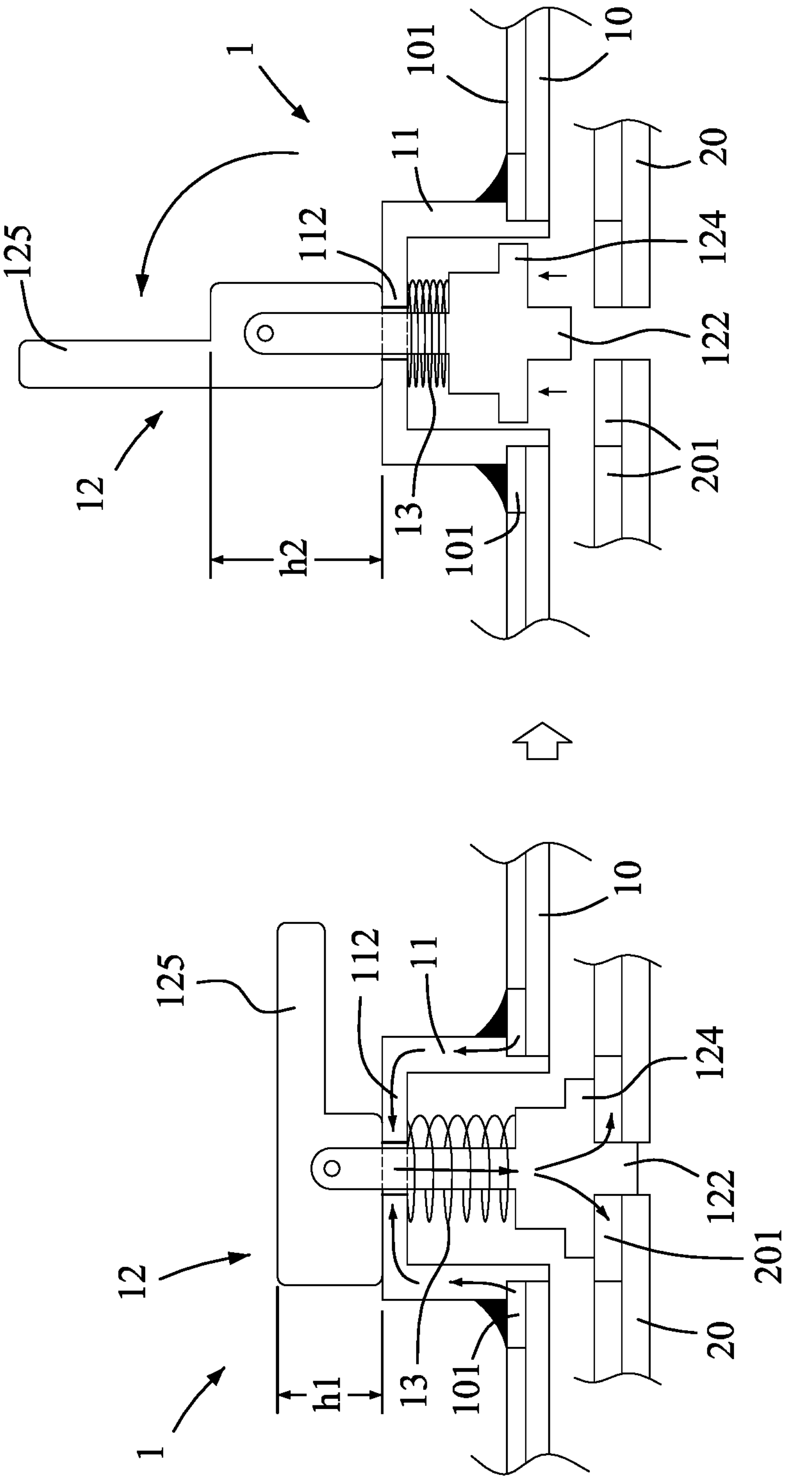
FIG. 9 is a schematic view of the operation of the electrically conductive device according to the ninth embodiment of the disclosure.
Figure 10:
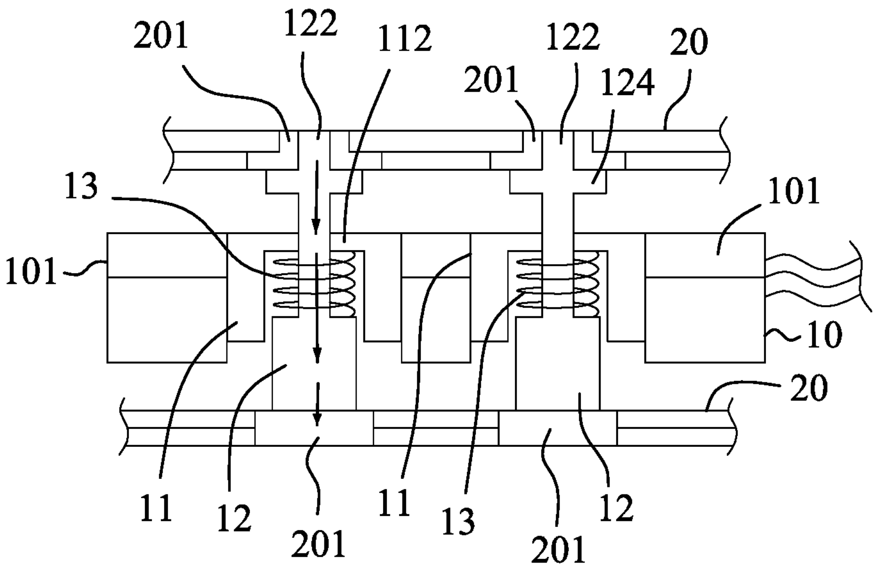
FIG. 10 is a schematic view of the operation of the electrically conductive device according to the tenth embodiment of the disclosure.
Figure 11:
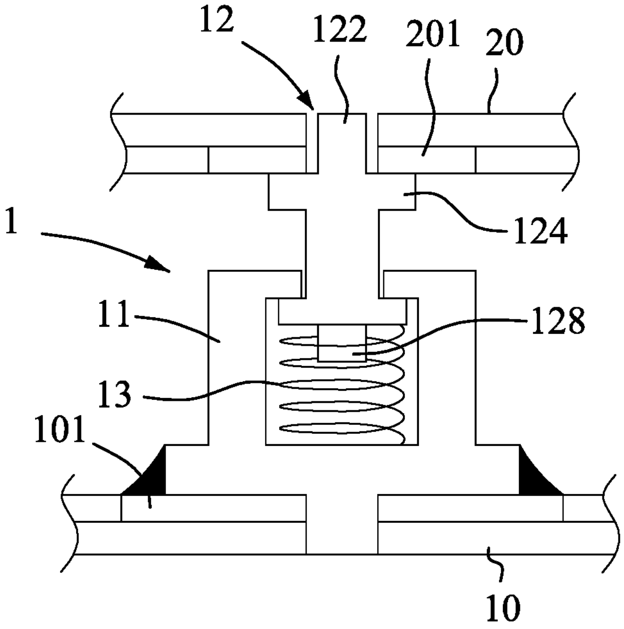
FIG. 11 is a schematic view of the operation of the electrically conductive device according to the eleventh embodiment of the disclosure.

In addition to the aforesaid embodiments, as shown in FIG. 8, in an embodiment of the disclosure, the electrically conductive device 1 is mounted on the first object 10 with a fastening element 111 through the body portion 11. Thus, the body portion 11 of the electrically conductive device 1 is firmly mounted on the first object 10 to couple together or separate the first object 10 and the second object 20 and steadily conduct an electric current between the first object 10 and the second object 20.

In addition to the aforesaid embodiments, in an embodiment of the disclosure, the motion portion 12 has a control portion 125. The control portion 125 has a first height h1 and a second height h2. The first height h1 is greater than, less than or equal to the second height h2. Thus, the control portion 125 can be rotated to move the motion portion 12 so as for the motion portion 12 to come into contact with, be hot-plugged to or hot-unplugged from, or snap-stop the second object 20 and steadily conduct an electric current between the first object 10 and the second object 20.

In addition to the aforesaid embodiments, in an embodiment of the disclosure, the motion portion 12 has a pressing portion 124 and a clasping portion 127, which are both conducive to pressing-enabled electrical conduction, clasping-enabled electrical conduction or position limitation electrical conduction.

In addition to the aforesaid embodiments, in an embodiment of the disclosure, a position-limiting portion 112 is disposed between the body portion 11 and the motion portion 12 and adapted to position-limit the motion portion 12, allowing the motion portion 12 to be steadily confined to the body portion 11.

In addition to the aforesaid embodiments, in an embodiment of the disclosure, the control portion 125 and the motion portion 12 moves or undergoes motion, to start, stop an electric current or signal.

Figure 12:
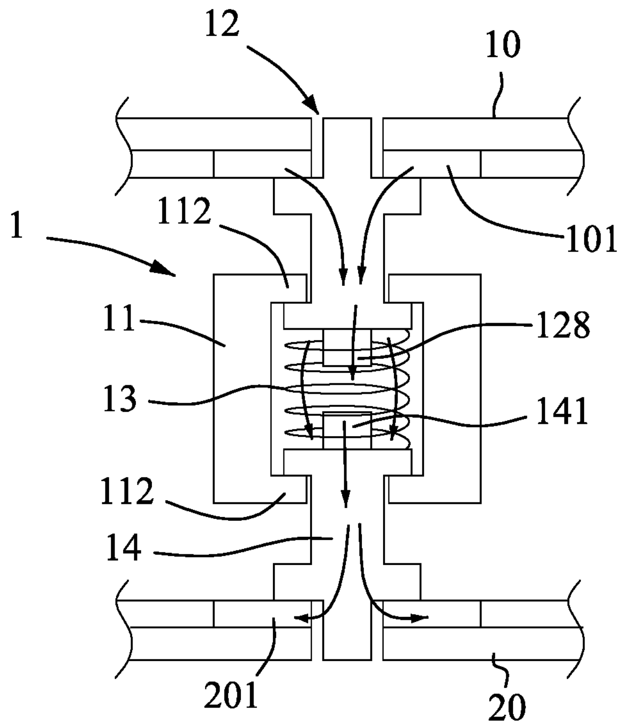
FIG. 12 is a schematic view of the operation of the electrically conductive device according to the twelfth embodiment of the disclosure.
Figure 13:
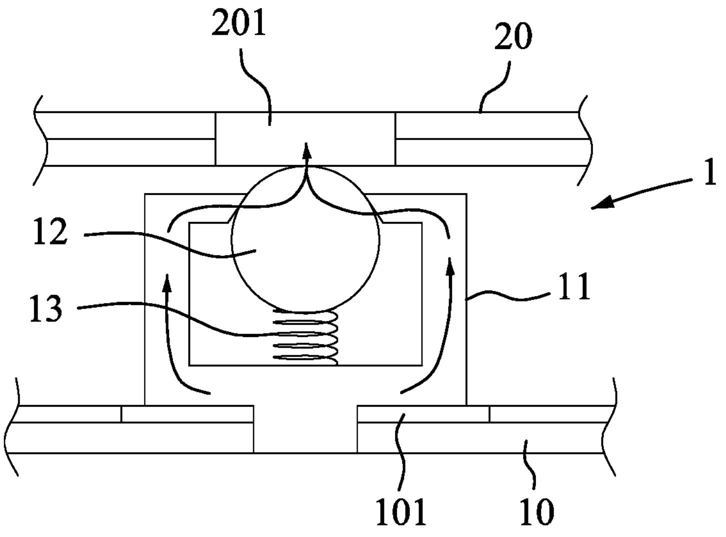
FIG. 13 is a schematic view of the operation of the electrically conductive device according to the thirteenth embodiment of the disclosure.

Referring to FIG. 12, in addition to the aforesaid embodiments, in an embodiment of the disclosure, the electrically conductive device 1 further has another motion portion 14 corresponding in position to the motion portion 12, with the resilient component 13 disposed between the motion portion 12 and the other motion portion 14 to allow the electrically conductive device 1 to conduct an electric current between the first object 10 and the second object 20 through the motion portion 12, the other motion portion 14 and the resilient component 13.

In addition to the aforesaid embodiments, in an embodiment of the disclosure, the motion portion 12 and the other motion portion 14 have restraining portions 128, 141 respectively, and the resilient component 13 is penetratingly disposed at the restraining portions 128, 141 to enhance the stability of the operation of the motion portion 12 and the other motion portion 14.

Referring to FIG. 12, in addition to the aforesaid embodiments, in an embodiment of the disclosure, the motion portion 12 is a spherical element (or wheel element). Therefore, the disclosure meets actual application needs.

Figure 14:
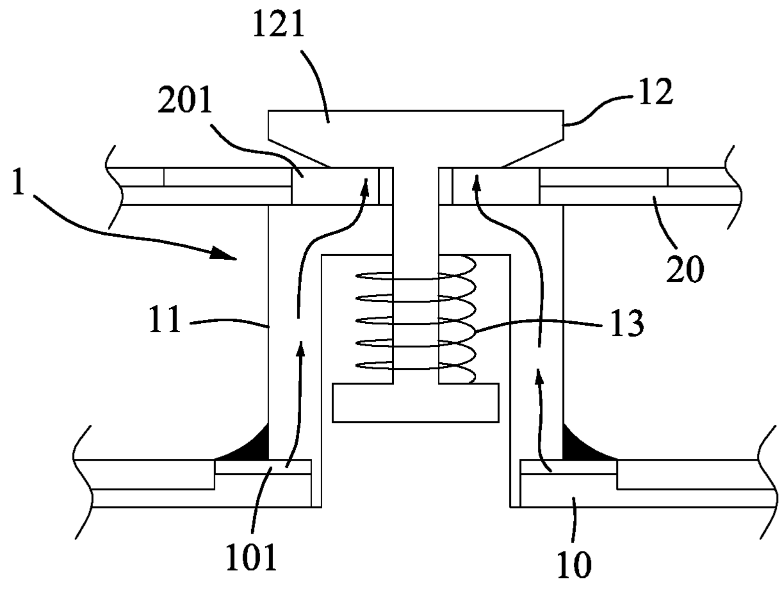
FIG. 14 is a schematic view of the operation of the electrically conductive device according to the fourteenth embodiment of the disclosure.

Referring to FIG. 14, in addition to the aforesaid embodiments, in an embodiment of the disclosure, the motion portion 12 is not an electrically conductive element, and the second electrically conductive element 201 of the second object 20 is in direct contact with the body portion 11 to effectuate electrical conduction. Thus, the body portion 11 conducts an electric current between the first object 10 and the second object 20 to allow the electrically conductive device 1 to conduct the electric current between the first object 10 and the second object 20. Therefore, the disclosure meets actual application needs.

Figure 15:
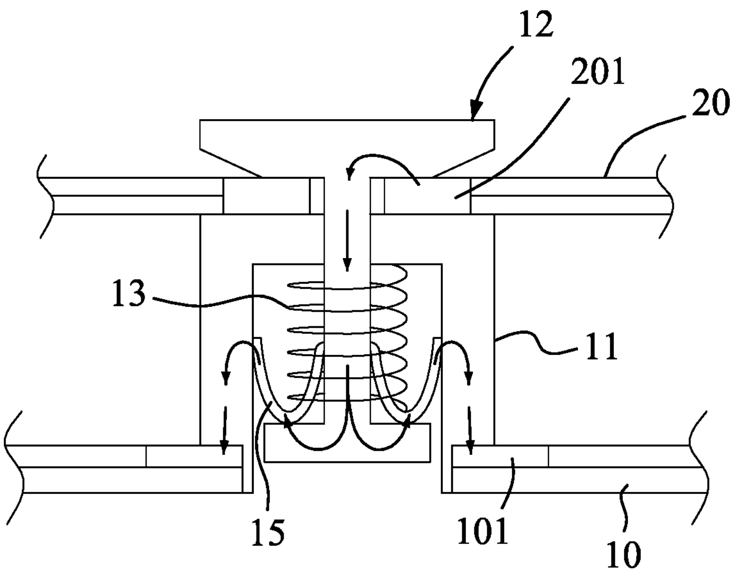
FIG. 15 is a schematic view of the operation of the electrically conductive device according to the fifteenth embodiment of the disclosure.
Figure 16:
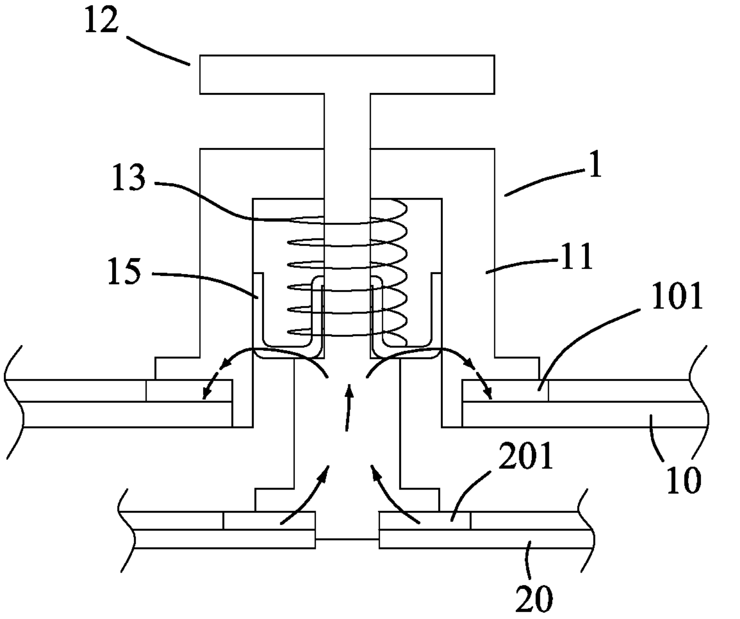
FIG. 16 is a schematic view of the operation of the electrically conductive device according to the sixteenth embodiment of the disclosure.
Figure 17:
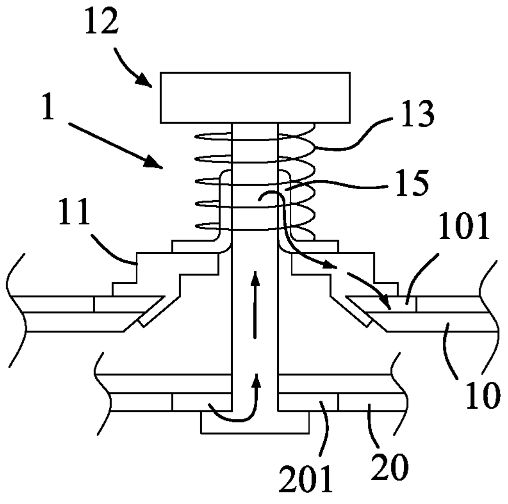
FIG. 17 is a schematic view of the operation of the electrically conductive device according to the seventeenth embodiment of the disclosure.
Figure 18:
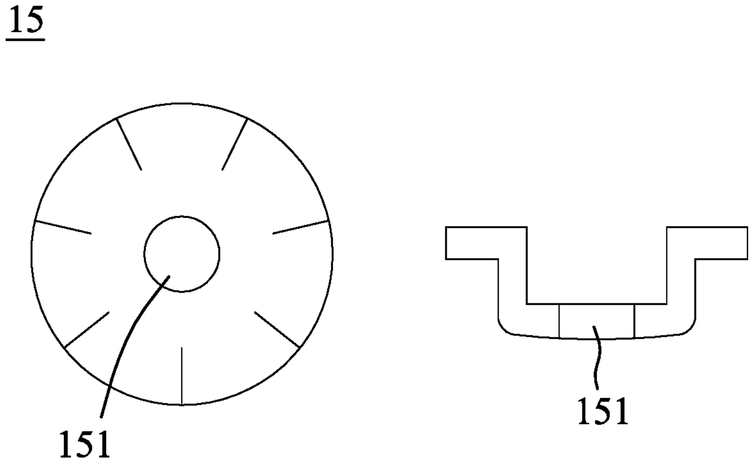
FIG. 18 is a schematic view of a conductor portion according to an embodiment of the disclosure.

Referring to FIG. 15 through FIG. 18, in addition to the aforesaid embodiments, in an embodiment of the disclosure, the resilient component 13 abuts against a conductor portion 15. The conductor portion 15 comes into contact with, interferes with, abuts against, resiliently comes into contact with, resiliently interferes with or resiliently abuts against the body portion 11 and the motion portion 12 to effectuate electrical conduction (as shown in FIG. 15 through FIG. 17). Therefore, the disclosure meets actual application needs.

In addition to the aforesaid embodiments, in an embodiment of the disclosure, the conductor portion 15 is a leaf spring, copper sheet, copper-beryllium alloy element, object electroplated with an electrically conductive layer, resilient element or metallic element. As shown in FIG. 17, the conductor portion 15 is a leaf spring and has a through-hole 151 which the motion portion 12 is penetratingly disposed at. Therefore, the disclosure meets actual application needs.

Figure 19:
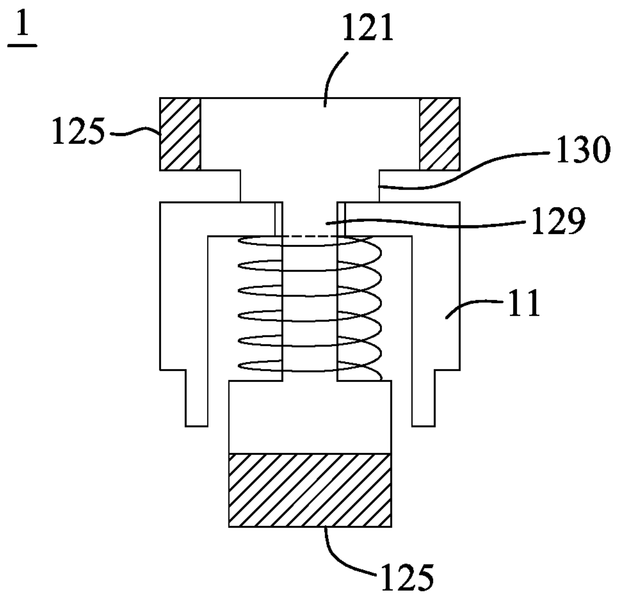
FIG. 19 is a schematic view of according to the eighteenth embodiment of the disclosure.
Figure 20A:
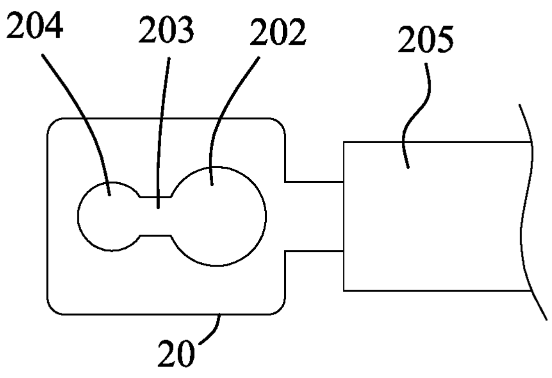
FIG. 20A is a first schematic view of a second object according to an embodiment of the disclosure.
Figure 20B:
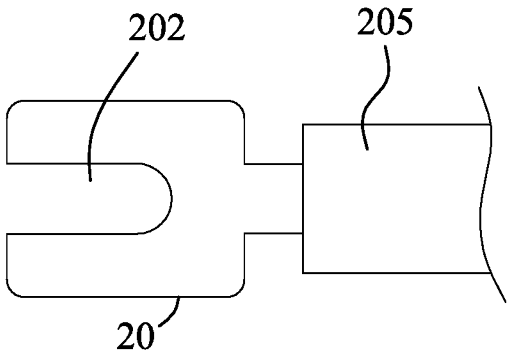
FIG. 20B is a second schematic view of the second object according to an embodiment of the disclosure.
Figure 21:
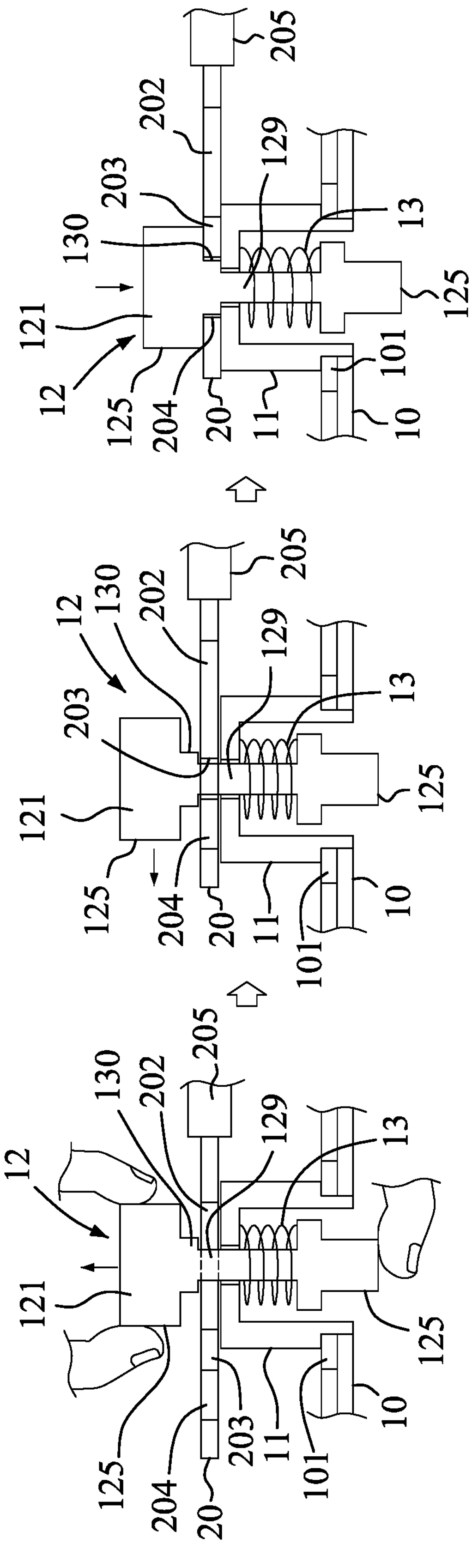
FIG. 21 is a schematic view of the operation of the electrically conductive device according to the eighteenth embodiment of the disclosure.

Referring to FIG. 19 through FIG. 21, in addition to the aforesaid embodiments, in an embodiment of the disclosure, the motion portion 12 has a head portion 121 and a neck portion 129, whereas the second object 20 is an electrically conductive element and is electrically connected to a conducting wire 205. The neck portion 129 passes through an admission portion 202 of the second object 20. Alternatively, the head portion 121 and the neck portion 129 engage with a movement portion 203 of the second object 20 to effectuate electrical conduction between the first object 10 and the second object 20.

In addition to the aforesaid embodiments, in an embodiment of the disclosure, the motion portion 12 further has a fixed connection portion 130, and the neck portion 129 passes through the admission portion 202 of the second object 20, such that the head portion 121 engages with a fixation portion 204 of the second object 20 through the fixed connection portion 130, effectuating electrical conduction between the first object 10 and the second object 20.

In addition to the aforesaid embodiments, in an embodiment of the disclosure, the admission portion 202 is larger than the head portion 121, or the movement portion 203 is larger than the neck portion 129 but smaller than the admission portion 202, or the movement portion 203 is smaller than the fixed connection portion 130, or the fixation portion 204 is larger than the fixed connection portion 130. Therefore, the disclosure meets actual application needs.

In addition to the aforesaid embodiments, in an embodiment of the disclosure, the two ends of the motion portion 12 each have a control portion 125 whereby the motion portion 12 or two ends of the motion portion 12 are pull-operable or press-operable. Therefore, the disclosure meets actual application needs.

In addition to the aforesaid embodiments, in an embodiment of the disclosure, the motion portion is an electrically conductive element. Alternatively, the motion portion is not an electrically conductive element. Alternatively, the resilient component is an electrically conductive element. Alternatively, the resilient component is not an electrically conductive element. Therefore, the disclosure meets actual application needs.

In addition to the aforesaid embodiments, the admission portion 202 is a through-hole, slot portion, opening portion, slotted portion, closed opening (shown in FIG. 20A) or open opening (shown in FIG. 20B).

The disclosure is disclosed above by preferred embodiments. However, persons skilled in the art should understand that the embodiments are illustrative of the disclosure only, but shall not be interpreted as restrictive of the scope of the disclosure. Hence, all equivalent modifications and replacements made to the aforesaid embodiments shall be deemed falling within the scope of the claims of the disclosure. Accordingly, the legal protection for the disclosure shall be defined by the appended claims.

What is claimed is:

1. An electrically conductive device, comprising:

a body portion mounted on a first object;

a motion portion disposed within and movably fitted in contact with the body portion, wherein the motion portion comprises a head portion disposed outside the body portion; and a resilient component disposed at the body portion;

wherein the body portion and the motion portion are electrical conduction components to form a conducting path of an electric current between the first object and a second object through the body portion and the head portion, and wherein two ends of the resilient component abut against the body portion and the motion portion respectively such that the body portion and the head portion resiliently clamp the second object through the resilient component, allowing the electric current to be conducted between the first object and the second object via the conducting path.

2. The electrically conductive device of claim 1, wherein the electrically conductive device is mounted on the first object, the first object has a first electrically conductive element for conducting an electric current, and the second object has a second electrically conductive element for conducting an electric current, or the body portion is mounted on the first object to conduct an electric current to the second object.

3. The electrically conductive device of claim 1, wherein the motion portion has an insulating portion for operating or manipulating the motion portion, or both the motion portion and the resilient component are compressed, allowing a resilient intervening space to be formed between the motion portion and the body portion.

4. The electrically conductive device of claim 1, wherein the body portion is mounted on the first object, and the motion portion resiliently presses against, engages with, grips, pushes or abuts against the second object through compression of the resilient component, allowing an electric current from the first object to be conducted to the second object.

5. The electrically conductive device of claim 1, wherein the electrically conductive device is mounted on the first object, the motion portion separates from the second object while conducting an electric current, so as to start or stop conduction of an electric current to be hot-plugged to or hot-unplugged from the second object.

6. The electrically conductive device of claim 1, wherein the motion portion enables an electric current to be passed to the second object, position-limits the second object or comes into contact with the second object, or the motion portion has a pressing portion for pressing against the second object or a second electrically conductive element of the second object when the motion portion position-limits or comes into contact with the second object.

7. The electrically conductive device of claim 1, wherein the motion portion has a control portion with a first height and a second height, the first height being greater than, less than or equal to the second height, or the control portion is rotated to move the motion portion so as for the motion portion to come into contact with, be hot-plugged to or hot-unplugged from, or snap-stop the second object.

8. The electrically conductive device of claim 1, wherein the motion portion has a pressing portion or a clasping portion required for pressing-enabled electrical conduction, clasping-enabled electrical conduction or position-limitation-enabled electrical conduction, or transmission of an electric current between the first object and the second object is enabled by the motion portion, the electrically conductive device, the body portion or the resilient component.

9. The electrically conductive device of claim 1, wherein a position-limiting portion is disposed between the body portion and the motion portion and adapted to effectuate position limitation, or the motion portion has a restraining portion, with the resilient component penetratingly disposed at the restraining portion to enhance stability of the motion portion.

10. The electrically conductive device of claim 1, further comprising another motion portion corresponding in position to the motion portion, with the resilient component disposed between the motion portion and the other motion portion.

11. The electrically conductive device of claim 1, wherein the motion portion is fitted to a control portion such that the control portion and the motion portion move or undergo motion to start and stop an electric current or signal, or the resilient component abuts against a conductor portion such that the conductor portion comes into contact with, interferes with, abuts against, resiliently comes into contact with, resiliently interferes with or resiliently abuts against the body portion or the motion portion to effectuate electrical conduction.

12. The electrically conductive device of claim 1, wherein the motion portion has a neck portion, the neck portion passing through an admission portion of the second object, or the head portion and the neck portion engage with a movement portion of the second object to effectuate electrical conduction between the first object and the second object, or the admission portion is larger than the head portion, or the movement portion is larger than the neck portion but smaller than the admission portion, or the admission portion is a through-hole, slot portion, opening portion, slotted portion, closed opening or open opening, or a fixed connection portion and a neck portion, the neck portion passing through an admission portion of the second object, or the head portion is lifted to allow the fixed connection portion to engage with a fixation portion of the second object, effectuating electrical conduction between the first object and the second object, or the admission portion is larger than the head portion, or the movement portion is larger than the neck portion but smaller than the admission portion, or the movement portion is smaller than the fixed connection portion, or the fixation portion is larger than the fixed connection portion.

* * * * *